Sept. 29, 1964 G. A. COSTELLO 3,151,214

ELECTROLUMINESCENT PLATE SCREEN AND CIRCUIT THEREFOR

Filed May 31, 1960

INVENTOR.
George A. Costello
BY John J. Kowalik
Att'y.

United States Patent Office 3,151,214

Patented Sept. 29, 1964

3,151,214

ELECTROLUMINESCENT PLATE SCREEN AND CIRCUIT THEREFOR

George A. Costello, 6852 W. Dickens, Chicago 35, Ill.

Filed May 31, 1960, Ser. No. 32,624
7 Claims. (Cl. 178—6)

This invention apertains to a novel electron image producing apparatus and more particularly to a novel screen and scanning circuit therefor.

A general object of the invention is to devise a novel flat screen and a circuit therefor which may be readily integrated into existing television circuits utilizing conventional circuit components.

A further object of the invention is to provide a novel flat screen which comprises a grid of tuned wires formed and arranged to correspond to incoming signals, the components of which are tuned to activate predetermined grid sections.

A different object of the invention is to provide a novel screen and circuit which comprises a grid of vertical and horizontal wires each of which is part of an LC circuit fed by the horizontal and vertical outputs of any conventional video circuit.

The invention contemplates the provision of a fluorescent screen comprising vertical and horizontal wires arranged in a grid, the crossing points of the wires corresponding to preselected video signal components and causing the adjacent area of the plate to glow proportional to the applied instantaneous voltage or current.

It is a further object of this invention to provide a novel image screen comprising a fluorescent plate with intersecting vertical and horizontal grid conductors, the horizontal conductors being inductively connected at one end to one output lead of a horizontal circuit and at their other ends being capacitively coupled to the other output lead of the horizontal circuit, and similarly, the vertical conductors having one of their ends inductively coupled to one output lead of a vertical circuit and at their other ends capacitively coupled to the other output lead of the vertical circuit, means being provided to modulate one of the signals to provide blanking and contrast information.

The principal object of the invention is to devise a novel arrangement for scanning an electroluminescent screen by LC circuits with FM video signals which may be RF amplified and (AM) amplitude modulated.

These and other objects inherent in and encompassed by the invention will become more readily apparent from the specification and the drawings wherein.

Figures 1, 3:
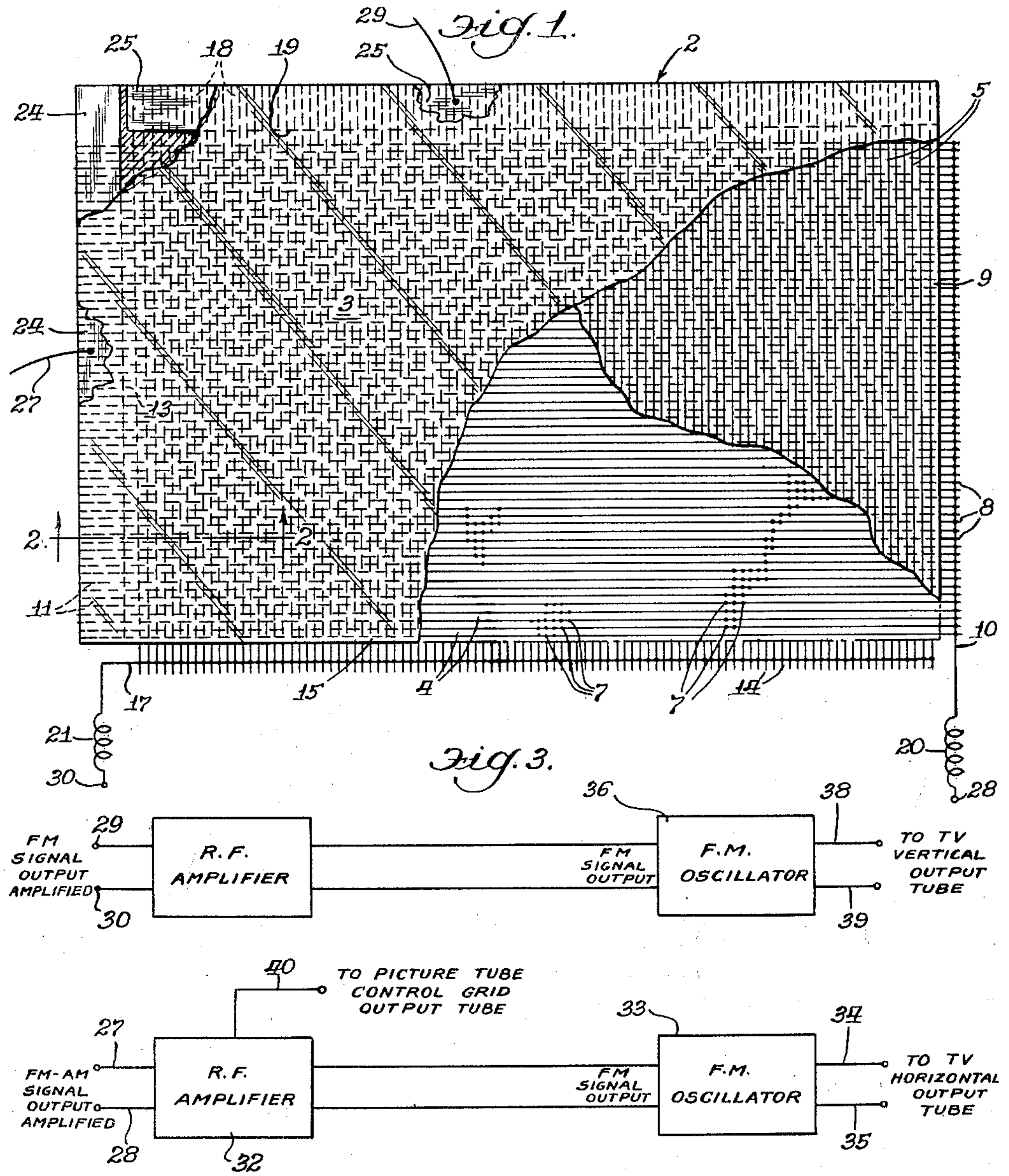
FIGURE 1 is a plan view partially broken away of the novel screen.
FIGURE 3 is a schematic representation of the novel circuit for said screen.
Figure 2:
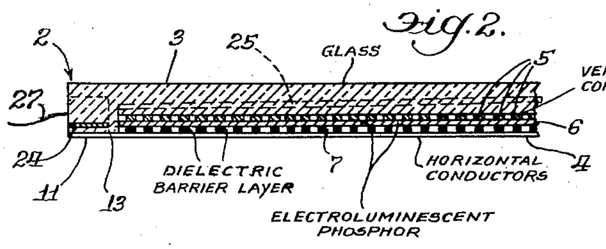
FIGURE 2 is a fragmentary cross-sectional view taken substantially on line 2—2 of FIGURE 1.

Describing the invention in detail and having particular reference to the drawings there is illustrated a rectangular electroluminescent screen generally indicated 2 which may be such as shown and described for example in U.S. Patents 2,883,582, 2,774,813, and 2,698,915 and in addition to the supporting glass 3 includes horizontal grid wires 4 and crossing vertical grid wires 5 which are adapted to actuate a phosphor or other luminescent material 6 therebetween through a dielectric barrier layer 7. The vertical and horizontal lines 4 and 5 are preferably made of transparent metalized grid wires. The horizontal wires are connected at one of their corresponding ends 8 at one side 9 of screen 2 to a common line 10 and the other ends 11 project a selected distance beyond the opposite edge 13 of screen 2. Similarly the ends 14 of wires 5 at one edge 15 of the plate are connected to a common lead 17 and the other ends 18 project a predetermined length beyond the adjacent edge 19 of screen 2. The lead 10 is connected to one end of an inductance coil 20 and the lead 17 is connected to one end of inductance coil 21. The ends 11 of wires 4 oppose and are spaced from a capacitor plate 24 and ends 18 of wires 5 oppose and are spaced from a capacitor plate 25. In the exemplary form of the invention, the width of each plate corresponds or approximates the length of the extended end portion of the adjacent set of wires and provides a capacitance therewith. The distance between each wire and the respective capacitance plate differs and thus different capacitance between each wire and opposing plate is effected. It will be readily apparent that since one end of each wire is a coil and the other end is a capacitor, each wire is part of an LC circuit and since each circuit has a different capacitance it therefore has a different resonant frequency. Therefore it follows that if an A.C. (alternating current) were applied to the input leads 27, 28, the wire whose frequency corresponds to that of the instant A.C. signal will conduct a current. Similarly, the vertical wires are activated and the input ends of those LC circuits are 29, 30 and if another A.C. current were impressed to terminals 29, 30, the wire 5 whose resonant frequency corresponds to the frequency of this latter A.C. current will conduct the current. The point at which the resonating horizontal and vertical wires intersect activates the corresponding phosphor area causing it to glow, the intensity of which is proportional to the current (or voltage) going through the wires. It becomes apparent that upon the application of currents or potential of changing frequency to 27, 28 and 29, 30, the activated glowing spot of fluorescence will move and if the motion is periodic, the points will appear to blend and the entire screen will fluoresce if current with frequencies corresponding to all the wires is applied. Since an FM (frequency modulated) signal is of the type whose frequency changes continuously and periodically, the terminals 27, 28 are connected through a radio frequency (RF) amplifier 32 to an FM oscillator circuit 33 which is connected through leads 34, 35 to the horizontal output of any conventional video circuit and the leads 29, 30 are connected through an RF amplifier to an FM oscillator circuit 36, which is connected through leads 38, 39 to the vertical output of the conventional video circuit. The frequency of the two signals, that is the vertical and horizontal would depend upon the current fed from the vertical and horizontal output tubes. The position of each spot on an electron beam tube is a function of the power source emanating from the two output tubes and this obtains a corresponding effect on the surface of the picture tube where the electrons hit the face of the tube inasmuch as the beam on the picture tube form a raster, the spot on the electroluminescent plate would also form a raster and be identical to that formed on a conventional picture tube, because the instantaneous FM frequency depends upon the output current, which is the same current which moves the beam in the picture tube. By modulating the current (or voltage) delivered by either RF amplifier (for example the horizontal), such as by connection of the grid of the RF amplifier to the grid control output tube of the conventional video circuit by lead 40 the intensity of light on the screen 2 will be affected by the output of the RF amplifier. If the frequency of fluctuation were high, different portions of the screen 2 will appear, black, white or gray depending upon the current (or voltage) going through a wire which is resonating. This control of the RF output can be had by having the same tube or circuit which controls the voltage of the grid in a picture tube control this output.

Since this control tube provides blanking and contrast information, this will be reflected in the current flowing through the different wires such that RF output at maximum value will be white on the screen, gray a partial output and blanking or black no current passing through the horizontal wires. The number of wires and thus number of frequencies can be such as will obtain an adequate picture, it being understood that the principal concept being the scanning of the electroluminescent screen by LC circuits with FM video signals.

It will be noted that the foregoing description and exemplary illustration has been chosen for purposes of disclosure and is not intended in any way to limit the invention set forth in the appended claims.

I claim:

1. The combination of an electroluminescent screen comprising a layer of electroluminescent material which emits a light in response to an applied electrical field, first and second grid sets each composed of nonintersecting conductors cooperatively associated with said layer of material, said sets arranged in an intersecting pattern, the conductors of one set forming a plurality of crossings with the conductors of the other set for lighting contiguous areas of said material upon the application of an exciting potential to the conductors of respective sets, capacitor means associated with one of the ends of the conductors of each set, an inductance connected to the other ends of each set, and means for applying in preselected sequence an exciting potential through said inductance and capacitor means to respective sets of conductors.

2. The invention according to claim 1 and further characterized in that said means comprises the combination of vertical and horizontal video signal output means, and means for converting said horizontal and vertical signals to frequency modulated signals connected in series with the conductors of respective sets of grids.

3. The combination of an electroluminescent screen comprising a layer of electroluminescent material which emits a light in response to an applied electrical medium, first and second grid sets composed of nonintersecting conductors cooperatively associated with said layer of material, said sets arranged in an intersecting pattern, the conductors of one set forming a plurality of crossings with the conductors of the other set for lighting contiguous areas of said material upon the application of an exciting electrical medium to crossing conductors of respective sets, said conductors of each set having corresponding end portions projecting outwardly of the screen, a single capacitor plate capacitively associated with said end portions of each set providing a varying capacitance with each conductor, an inductance coil connected to the corresponding other ends of each set, and means for impressing an exciting potential of predetermined frequencies to each set through said capacitor means and inductance coil.

4. In combination with vertical and horizontal image producing signal output stages, a frequency modulated oscillator circuit in series with each said stages and each having a pair of output leads, and an electroluminescent screen comprising a plurality of vertical and horizontal conductors and a layer of electroluminescent material arranged in an image-producing arrangement upon the application of electrical stimuli to said conductors, each said vertical and horizontal conductors being part of LC circuits coupled to the outputs of the oscillator circuits of said vertical and horizontal stages, respectively, and in phase therewith, and each said LC circuits comprising a single capacitor plate at one end of each set of wires in overlapping and diverging relationship therewith.

5. Mural type picture producing apparatus comprising means including a first group of elongated parallel substantially coplanar electrically energizable members, a second group of elongated parallel substantially coplanar electrically energizable members each extending transversely across said members, a picture reproducing medium intermediate said members energizable at the crossing points thereof, a video circuit including vertical and horizontal signal output means, and phased signal sources selectively energizing said members including a pair of FM oscillators with RF amplification means coupled vertical and horizontal signal output means and respectively coupled to said first and second groups in LC circuits therewith.

6. Mural type picture producing apparatus comprising two superimposed groups of parallel elongated electrically isolated members having the members of one group arranged perpendicular to those of the other group and defining a multiplicity of picture elements at the points where said members cross, picture producing medium associated with said members, said members each forming part of an LC circuit each responsive to a different selected frequency in a predetermined picture-producing array and said LC circuits including a capacitor plate capacitively coupled with each group of members and inductance means connected to each group of members, two RF amplifier stages, one having an output coupled to one group of members through the plate and inductance means thereof and the other having an output coupled to the other group of members through the plate and inductance thereof, two FM oscillator circuits having outputs coupled to respective RF stages and having inputs coupled respectively to horizontal and vertical signal output means of an associated triggering circuit.

7. The invention according to claim 6 and contrast signal means coupled to at least one RF amplifier stage.

References Cited in the file of this patent

UNITED STATES PATENTS

| | | |
|---|---|---|
| 1,383,750 | Parker et al. | July 5, 1921 |
| 2,796,584 | Hurvitz | June 18, 1957 |
| 2,818,531 | Peek | Dec. 31, 1957 |
| 2,863,711 | Hurvitz | Dec. 9, 1958 |
| 2,877,371 | Orthuber et al. | Mar. 10, 1959 |
| 2,883,582 | Hanlet | Apr. 21, 1959 |
| 2,886,731 | Zappacosta | May 12, 1959 |
| 2,892,968 | Kallmann et al. | June 30, 1959 |

FOREIGN PATENTS

| | | |
|---|---|---|
| 1,133,387 | France | Nov. 19, 1956 |